US012650854B1

(12) United States Patent
Bitincka et al.

(10) Patent No.: US 12,650,854 B1
(45) Date of Patent: *Jun. 9, 2026

(54) PACK FRAMEWORK IN AN OBSERVABILITY PIPELINE SYSTEM

(71) Applicant: Cribl, Inc., San Francisco, CA (US)

(72) Inventors: Dritan Bitincka, Edgewater, NJ (US); Ledion Bitincka, San Francisco, CA (US); Nicholas Robert Romito, Chicago, IL (US)

(73) Assignee: Cribl, Inc., San Francisco, CA (US)

( * ) Notice: Subject to any disclaimer, the term of this patent is extended or adjusted under 35 U.S.C. 154(b) by 136 days.

This patent is subject to a terminal disclaimer.

(21) Appl. No.: 18/649,141

(22) Filed: Apr. 29, 2024

Related U.S. Application Data

(63) Continuation of application No. 17/746,527, filed on May 17, 2022, now Pat. No. 12,001,855.

(51) Int. Cl.
  *G06F 9/445*      (2018.01)
  *G06F 9/38*       (2018.01)
(52) U.S. Cl.
  CPC ........ *G06F 9/44505* (2013.01); *G06F 9/3867* (2013.01)
(58) Field of Classification Search
  None
  See application file for complete search history.

(56)          References Cited

U.S. PATENT DOCUMENTS 10,122,575 B2   11/2018  Peterson et al.
10,152,211 B2   12/2018  Koushik et al.

| | | |
|---|---|---|
| 11,394,767 B2 | 7/2022 | Bitincka et al. |
| 2009/0216915 A1 | 8/2009 | Dunn et al. |
| 2016/0080502 A1 | 3/2016 | Yadav et al. |
| 2017/0220685 A1 | 8/2017 | Yan et al. |
| 2019/0268446 A1 | 8/2019 | Hsiao et al. |
| 2020/0314262 A1 | 10/2020 | Ishikawa |

OTHER PUBLICATIONS

USPTO, Notice of Allowance issued in U.S. Appl. No. 17/746,527 on Jan. 30, 2024, 14 pages.
USPTO, Non-Final Office Action issued in U.S. Appl. No. 17/746,527 on Dec. 7, 2023, 9 pages.
"Cribl Inc. "Packs" documentation for Stream 3.0", released May 18, 2021, May 18, 21, 13 pgs.
Romito , "Unpacking Cribl Packs", Feb. 22, 2022, 8 pgs.

*Primary Examiner* — Paul Yen
(74) *Attorney, Agent, or Firm* — Young Basile Hanlon & MacFarlane, P.C.

(57)          ABSTRACT

In a general aspect, an observability pipeline system includes a pack data processing engine. In some aspects, an observability pipeline system includes data processing engines that are configured according to system default configuration settings and system local configuration settings. A pack file received from a remote computer system contains routes, pipelines, and pack default configuration settings. A pack data processing engine includes the routes and pipelines from the pack file. Pack local configuration settings, defined for the pack data processing engine, inherit at least one of the system default configuration settings and at least one of the pack default configuration settings. The pack local configuration settings are isolated from the system local configuration settings. When pipeline data is processed in the observability pipeline system on the computer system, the pack data processing engine is applied to the pipeline data.

21 Claims, 6 Drawing Sheets

400

402

Operating an obeservability pipeline system

404

Receiving a pack file

406

Importing the pack file

408

Defining a pack data processing engine

410

Defining pack local configuration settings

412

Processing pipeline data

PACK FRAMEWORK IN AN OBSERVABILITY PIPELINE SYSTEM

This application is a continuation of U.S. application Ser. No. 17/746,527 filed May 17, 2022, entitled "Pack Framework in an Observability Pipeline System". The above-referenced priority application is hereby incorporated by reference.

BACKGROUND

The following description relates to pack framework in an observability pipeline system.

Observability pipelines are used to route and process data in a number of contexts. For example, observability pipelines can provide unified routing of various types of machine data to multiple destinations, while adapting data shapes and controlling data volumes. In some implementations, observability pipelines allow an organization to interrogate machine data from its environment without knowing in advance the questions that will be asked. Observability pipelines may also provide monitoring and alerting functions, which allow systematic observation of data for known conditions that require specific action or attention.

DETAILED DESCRIPTION

In some aspects of what is described here, a data processing engine of an observability pipeline system includes one or more pack data processing engines. In some examples, each pack data processing engine includes routes, pipelines, data samples, and knowledge objects, and can be configured according to pack default configuration settings. In some instances, a pack data processing engine can be created and shared between computer systems within the same worker group or distinct worker groups. A pack data processing engine can be imported in an observability pipeline system of a computer system and then applied to process pipeline input data received from a data source. Applying the pack data processing engine to the pipeline input data generates pipeline output data, which can then be delivered to a data destination. Pack data processing engines can be managed by administrators or users, and they can be deployed in observability pipeline systems across one or more organizations or enterprises.

In some implementations, the systems and techniques described here can provide advantages and improvements over conventional technologies. For example, a pack framework deployed in an observability pipeline system can enable users to build and share configuration models, e.g., pack data processing engines, without reconfiguring common use cases, across distributed deployments of an observability pipeline system. In some cases, pack frameworks can provide knowledge that can be used to collect data from more sources and route data to more destinations. In some cases, a pack framework in an observability pipeline system can unlock immediate value for new data sources and groups coming onboard. The built-in knowledge and shareable content available via pack frameworks can reduce the cost, complexity, and time to manage an observability pipeline; can provide flexibility to scale expertise and may accelerate deployments across organization. Accordingly, the system and methods disclosed here may allow quick deployment of proven routes, pipelines, and knowledge objects or leverage common use cases and solutions from other teams. In some cases, a combination of these and potentially other advantages and improvements may be obtained.

Figure 1:
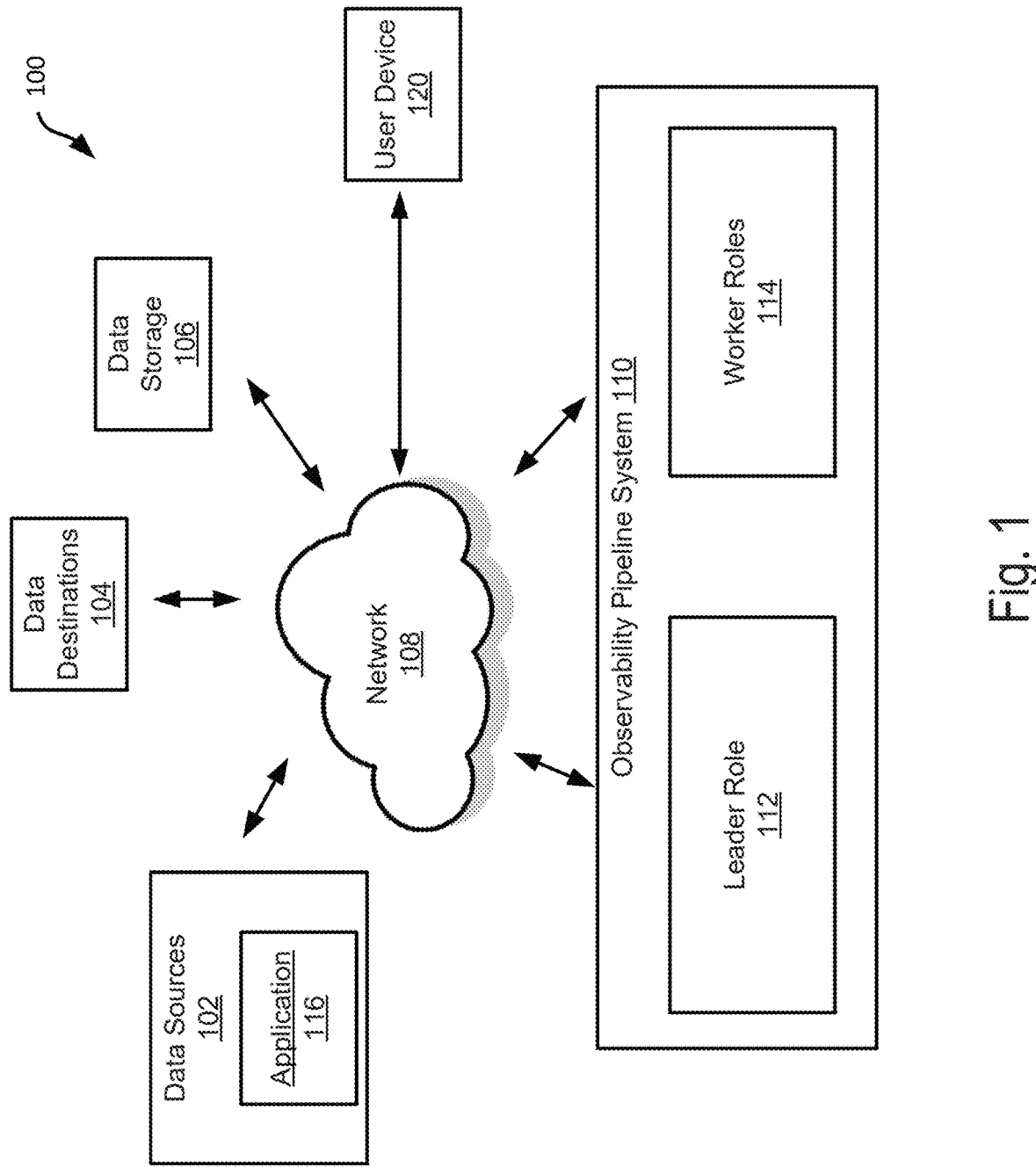
FIG. 1 is a block diagram showing aspects of an example computing environment that includes an observability pipeline system.

FIG. 1 is a block diagram showing aspects of an example computing environment 100 that includes an observability pipeline system 110. In addition to the observability pipeline system 110, the example computing environment 100 shown in FIG. 1 includes data sources 102, data destinations 104, data storage 106, network 108, and a user device 120. The data sources 102 includes an application 116. The computing environment 100 may include additional or different features, and the elements of the computing environment 100 may be configured to operate as described with respect to FIG. 1 or in another manner.

In some implementations, the computing environment 100 contains the computing infrastructure of a business enterprise, an organization, or another type of entity or group of entities. During operation, various data sources 102 in an organization's computing infrastructure produce volumes of machine data that contain valuable or useful information. The machine data may include data generated by the organization itself, data received from external entities, or a combination. By way of example, the machine data can include network packet data, sensor data, application program data, observability data, and other types of data. Observability data can include, for example, system logs, error logs, stack traces, system performance data, or any other data that provides information about computing infrastructure and applications (e.g., performance data and diagnostic information). The observability pipeline system 110 can receive and process the machine data generated by the data sources 102. For example, the machine data can be processed to diagnose performance problems, monitor user interactions, and to derive other insights about the computing environment 100. Generally, the machine data generated by the data sources 102 does not have a common format or structure, and the observability pipeline system 110 can generate structured output data having a specified form, format, or type. The output generated by the observability pipeline system can be delivered to data destinations 104, data storage 106, or both. In some cases, the data delivered to the data storage 106 includes the original machine data that was generated by the data sources 102, and the observability pipeline system 110 can later retrieve and process the machine data that was stored on the data storage 106.

In general, the observability pipeline system 110 can provide a number of services for processing and structuring machine data for an enterprise or other organization. In some instances, the observability pipeline system 110 provides schema-agnostic processing, which can include, for example, enriching, aggregating, sampling, suppressing, or dropping fields from nested structures, raw logs, and other types of machine data. The observability pipeline system 110 may also function as a universal adapter for any type of machine data destination. For example, the observability pipeline system 110 may be configured to normalize, de-normalize, and adapt schemas for routing data to multiple destinations. The observability pipeline system 110 may also provide protocol support, allowing enterprises to work with existing data collectors, shippers, and agents, and providing simple protocols for new data collectors. In some cases, the observability pipeline system 110 can test and validate new configurations and reproduce how machine data was processed. The observability pipeline system 110 may also have responsive configurability, including rapid reconfiguration to selectively allow more verbosity with pushdown to data destinations or collectors. The observability pipeline system 110 may also provide reliable delivery (e.g., at least once delivery semantics) to ensure data integrity with optional disk spooling.

The data sources 102, data destinations 104, data storage 106, observability pipeline system 110, and the user device 120 are each implemented by one or more computer systems that have computational resources (e.g., hardware, software, firmware) that are used to communicate with each other and to perform other operations. For example, each computer system may be implemented as the example computer system 500 shown in FIG. 5 or components thereof. In some implementations, computer systems in the computing environment 100 can be implemented in various types of devices, such as, for example, laptops, desktops, workstations, smartphones, tablets, sensors, routers, mobile devices, Internet of Things (IoT) devices, and other types of devices. Aspects of the computing environment 100 can be deployed on private computing resources (e.g., private enterprise servers, etc.), cloud-based computing resources, or a combination thereof. Moreover, the computing environment 100 may include or utilize other types of computing resources, such as, for example, edge computing, fog computing, etc.

The data sources 102, data destinations 104, data storage 106, observability pipeline system 110, and the user device 120 and possibly other computer systems or devices communicate with each other over the network 108. The example network 108 can include all or part of a data communication network or another type of communication link. For example, the network 108 can include one or more wired or wireless connections, one or more wired or wireless networks, or other communication channels. In some examples, the network 108 includes a Local Area Network (LAN), a Wide Area Network (WAN), a private network, an enterprise network, a Virtual Private Network (VPN), a public network (such as the Internet), a peer-to-peer network, a cellular network, a Wi-Fi network, a Personal Area Network (PAN) (e.g., a Bluetooth low energy (BTLE) network, a ZigBee network, etc.) or other short-range network involving machine-to-machine (M2M) communication, or another type of data communication network.

The data sources 102 can include multiple user devices, servers, sensors, routers, firewalls, switches, virtual machines, containers, or a combination of these and other types of computer devices or computing infrastructure components. The data sources 102 detect, monitor, create, or otherwise produce machine data during their operation. The machine data are provided to the observability pipeline system 110 through the network 108. In some cases, the machine data are streamed to the observability pipeline system 110 as pipeline input data.

The data sources 102 can include data sources designated as push sources (examples include Splunk TCP, Splunk HEC, Syslog, Elasticsearch API, TCP JSON, TCP Raw, HTTP/S, Raw HTTP/S, Kinesis Firehose, SNMP Trap, Metrics, and others), pull sources (examples include Kafkaj, Kinesis Streams, SQS, S3, Google Cloud Pub/Sub, Azure Blob Storage, Azure Event Hubs, Office 365 Services, Office 365 Activity, Office 365 Message Trace, Prometheus, and others), and other types of data sources. The data sources 102 can also include other applications 116.

In the example shown in FIG. 1, the application 116 includes a collection of computer instructions that constitute a computer program. The computer instructions reside in memory and execute on a processor. The computer instructions can be compiled or interpreted. An application 116 can be contained in a single module or can be statically or dynamically linked with other libraries. The libraries can be provided by the operating system or the application provider. The application 116 can be written in a variety of computer languages, including Java, "C," "C++," Python, Pascal, Go, or Fortan as a few examples.

The data destinations 104 can include multiple user devices, servers, databases, analytics systems, data storage systems, or a combination of these and other types of computer systems. The data destinations 104 can include, for example, log analytics platforms, time series databases (TSDBs), distributed tracing systems, security information and event management (SIEM) or user behavior analytics (UBA) systems, and event streaming systems or data lakes (e.g., a system or repository of data stored in its natural/raw format). The pipeline output data produced by the observability pipeline system 110 can be communicated to the data destinations 104 through the network 108.

The data storage 106 can include multiple user devices, servers, databases, or a combination of these and other types of data storage systems. Generally, the data storage 106 can operate as a data source or a data destination (or both) for the observability pipeline system 110. In some examples, the data storage 106 includes a local or remote filesystem location, a network file system (NFS), Amazon S3 buckets, S3-compatible stores, other cloud-based data storage systems, enterprise databases, systems that provides access to data through REST API calls or custom scripts, or a combination of these and other data storage systems. The pipeline output data, which may include the machine data from the data sources 102 as well as data analytics and other output from the observability pipeline system 100, can be communicated to the data storage 106 through the network 108.

The observability pipeline system 110 may be used to monitor, track, and triage events by processing the machine data from the data sources 102. The observability pipeline system 110 can receive an event data stream from each of the data sources 102 and identify the event data stream as pipeline input data to be processed by the observability pipeline system 110. The observability pipeline system 110 generates pipeline output data by applying observability pipeline processes to the pipeline input data and communicates the pipeline output data to the data destinations 104. In some implementations, the observability pipeline system 110 operates as a buffer between data sources 102 and data destinations 104, such that all data sources 102 send their data to the observability pipeline system 110, which handles filtering and routing the data to proper data destinations 104.

In some implementations, the observability pipeline system 110 unifies data processing and collection across many types of machine data (e.g., metrics, logs, and traces). The machine data can be processed by the observability pipeline system 110 by enriching it and reducing or eliminating noise and waste. The observability pipeline system 110 may also deliver the processed data to any tool in an enterprise designed to work with observability output data. For example, the observability pipeline system 110 may analyze event data and send analytics to multiple data destinations 104, thereby enabling the systematic observation of event data for known conditions which require attention or other action. Consequently, the observability pipeline system 110 can decouple data sources from data destinations and provide a buffer that makes many, diverse types of machine data easily consumable.

In some example implementations, the observability pipeline system 110 can operate on any type of machine data generated by the data sources 102 to properly observe, monitor, and secure the running of an enterprise's infrastructure and applications 116 while minimizing overlap, wasted resources, and cost. Specifically, instead of using different tools for processing different types of machine data, the observability pipeline system 110 can unify data collection and processing for all types of machine data (e.g., logs 204, metrics 206, and traces 208 shown in FIG. 2) and route the processed machine data to multiple data destinations 104. Unifying data collection can minimize or reduce redundant agents with duplicate instrumentation and duplicate collection for the multiple destinations. Unifying processing may allow routing of processed machine data to disparate data destinations 104 while adapting data shapes and controlling data volumes.

In an example, the observability pipeline system 110 obtains DogStatsd metrics, processes the DogStatsd metrics (e.g., by enriching the metrics), sends processed data having high cardinality to a first destination (e.g., Honeycomb) and processed data having low cardinality to a second, different destination (e.g., Datadog). In another example, the observability pipeline system 110 obtains windows event logs, sends full fidelity processed data to a first destination (e.g., an S3 bucket), and sends a subset (e.g., where irrelevant events are removed from the full fidelity processed data) to one or more second, different destinations (e.g., Elastic and Exabeam). In another example, machine data is obtained from a Splunk forwarder and processed (e.g., sampled). The raw processed data may be sent to a first destination (e.g., Splunk). The raw processed data may further be parsed, and structured events may be sent to a second destination (e.g., Snowflake).

The example observability pipeline system 110 shown in FIG. 1 includes a leader role 112 and multiple worker roles 114. The leader role 112 leads the overall operation of the observability pipeline system 110 by configuring and monitoring the worker roles 114; the worker roles 114 receive event data streams from the data sources 102 and data storage 106, apply observability pipeline processes to the event data, and deliver pipeline output data to the data destinations 104 and data storage 106.

The observability pipeline system 110 may deploy the leader role 112 and a number of worker roles 114 on a single computer node or on many computer nodes. For example, the leader role 112 and one or more worker roles 114 may be deployed on the same computer node. Or in some cases, the leader role 112 and each worker role 114 may be deployed on distinct computer nodes. The distinct computer nodes can be, for example, distinct computer devices, virtual machines, containers, processors, or other types of computer nodes.

The user device 120, the observability pipeline system 110, or both, can provide a user interface for the observability pipeline system 110. Aspects of the user interface can be rendered on a display (e.g., the display 550 in FIG. 5) or otherwise presented to a user. The user interface may be generated by an observability pipeline application that interacts with the observability pipeline system 110. The observability pipeline application can be deployed as software that includes application programming interfaces (APIs), graphical user interfaces (GUIs), and other modules.

In some implementations, an observability pipeline application can be deployed as a file, executable code, or another type of machine-readable instructions executed on the user device 120. The observability pipeline application, when executed, may render GUIs for display to a user (e.g., on a touchscreen, a monitor, or other graphical interface device), and the user can interact with the observability pipeline application through the GUIs. Certain functionality of the observability pipeline application may be performed on the user device 120 or may invoke the APIs, which can access functionality of the observability pipeline system 110. The observability pipeline application may be rendered and executed within another application (e.g., as a plugin in a web browser), as a standalone application, or otherwise. In some cases, an observability pipeline application may be deployed as an installed application on a workstation, as an "app" on a tablet or smartphone, as a cloud-based application that accesses functionality running on one or more remote servers, or otherwise.

In some implementations, the observability pipeline system 110 is a standalone computer system that includes only a single computer node. For instance, the observability pipeline system 110 can be deployed on the user device 120 or another computer device in the computing environment 100. For example, the observability pipeline system 110 can be implemented on a laptop or workstation. The standalone computer system can operate as the leader role 112 and the worker roles 114 and may execute an observability pipeline application that provides a user interface as described above. In some cases, the leader role 112 and each of the worker roles 114 are deployed on distinct hardware components (e.g., distinct processors, distinct cores, distinct virtual machines, etc.) within a single computer device. In such cases, the leader role 112 and each of the worker roles 114 can communicate with each other by exchanging signals within the computer device, through a shared memory, or otherwise.

In some implementations, the observability pipeline system 110 is deployed on a distributed computer system that includes multiple computer nodes. For instance, the observability pipeline system 110 can be deployed on a server cluster, on a cloud-based "serverless" computer system, or another type of distributed computer system. The computer nodes in the distributed computer system may include a leader node operating as the leader role 112 and multiple worker nodes operating as the respective worker roles 114. One or more computer nodes of the distributed computer system (e.g., the leader role) may communicate with the user device 120, for example, through an observability pipeline application that provides a user interface as described above. In some cases, the leader role 112 and each of the worker role 114 are distinct computer devices in the computing environment 100. In some cases, the leader role 112 and each of the worker roles 114 can communicate with each other using TCP/IP protocols or other types of network communication protocols transmitted over a network (e.g., the network 108 shown in FIG. 1) or another type of data connection.

In some implementations, the observability pipeline system 110 is implemented by software installed on private enterprise servers, a private enterprise computer device, or other types of enterprise computing infrastructure (e.g., one or more computer systems owned and operated by corporate entities, government agencies, other types of enterprises). In such implementations, some or all of the data sources 102, data destinations 104, data storage 106, and the user device 120 can be or include the enterprise's own computer resources, and the network 108 can be or include a private data connection (e.g., an enterprise network or VPN). In some cases, the observability pipeline system 110 and the user device 120 (and potentially other elements of the computer environment 100) operate behind a common firewall or other network security system.

In some implementations, the observability pipeline system 110 is implemented by software running on a cloud-based computing system that provides a cloud hosting service. For example, the observability pipeline system 110 may be deployed as a SaaS system running on the cloud-based computing system. For example, the cloud-based computing system may operate through Amazon® Web Service (AWS) Cloud, Microsoft Azure Cloud, Google Cloud, DNA Nexus, or another third-party cloud. In such implementations, some or all of the data sources 102, data destinations 104, data storage 106, and the user device 120 can interact with the cloud-based computing system through APIs, and the network 108 can be or include a public data connection (e.g., the Internet). In some cases, the observability pipeline system 110 and the user device 120 (and potentially other elements of the computer environment 100) operate behind different firewalls, and communication between them can be encrypted or otherwise secured by appropriate protocols (e.g., using public key infrastructure or otherwise).

Figure 2:
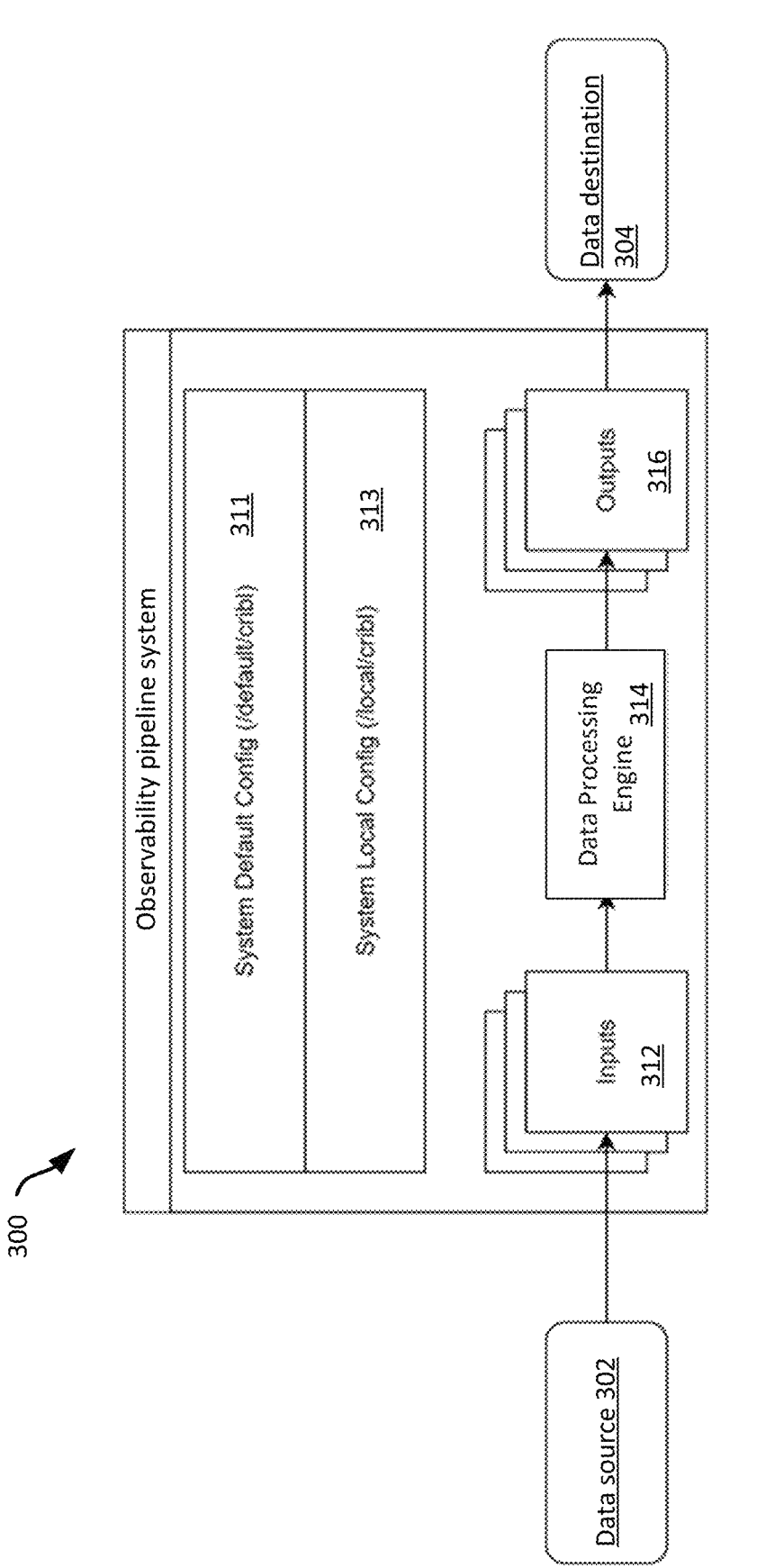
FIG. 2 is a block diagram showing aspects of an example observability pipeline system deployed in a worker role.
Figure 3A:
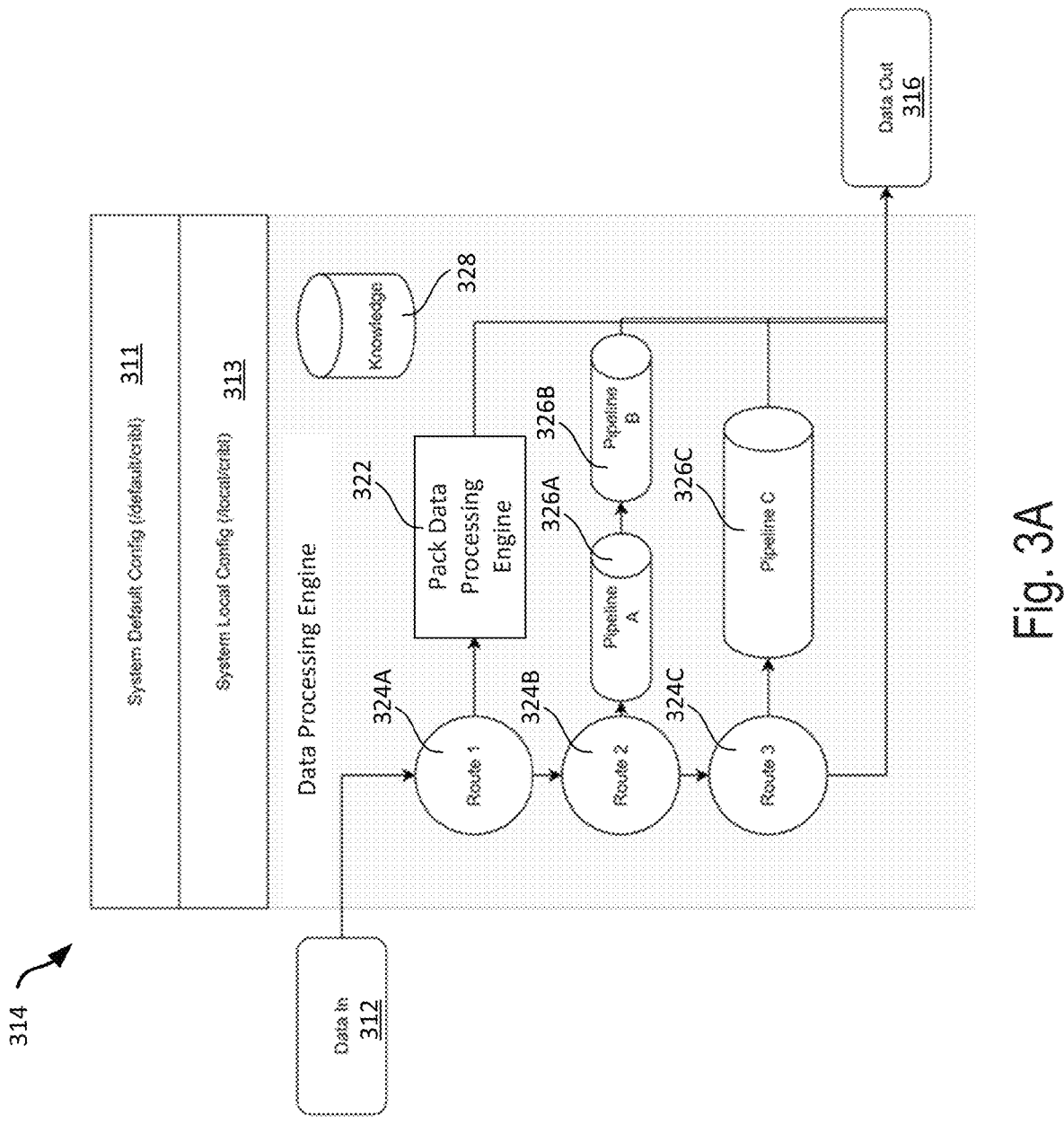
FIG. 3A is a block diagram showing aspects of an example stream data processing engine in the example observability pipeline system in FIG. 2.

In some implementations, the observability pipeline system 110 includes data processing engines (e.g., the data processing engine 314 in FIGS. 2, 3A). The data processing engines may include one or more pack data processing engines (e.g., the pack data processing engine 322 in FIGS. 3A-3B). A pack framework allows the pack data processing engines to be shared and installed with preconfigured settings. For example, the observability pipeline system 110 can receive and import a pack file that contains routes, pipelines, and knowledge objects, in addition to pack default configuration settings. The observability pipeline system 110 can then define a pack data processing engine that includes the routes, pipelines and potentially other components from the pack file, and the pack data processing engine can be configured according to the pack default configuration settings (provide via the pack file) and pack local configuration settings (e.g., provide locally). The pack data processing engine may then be applied to pipeline input data received from data sources 102 to generate structured output data. In some implementations, the observability pipeline system 110 includes output schemas which can be applied to the structured output data to generate pipeline output data for data destinations 104.

Figure 3B:
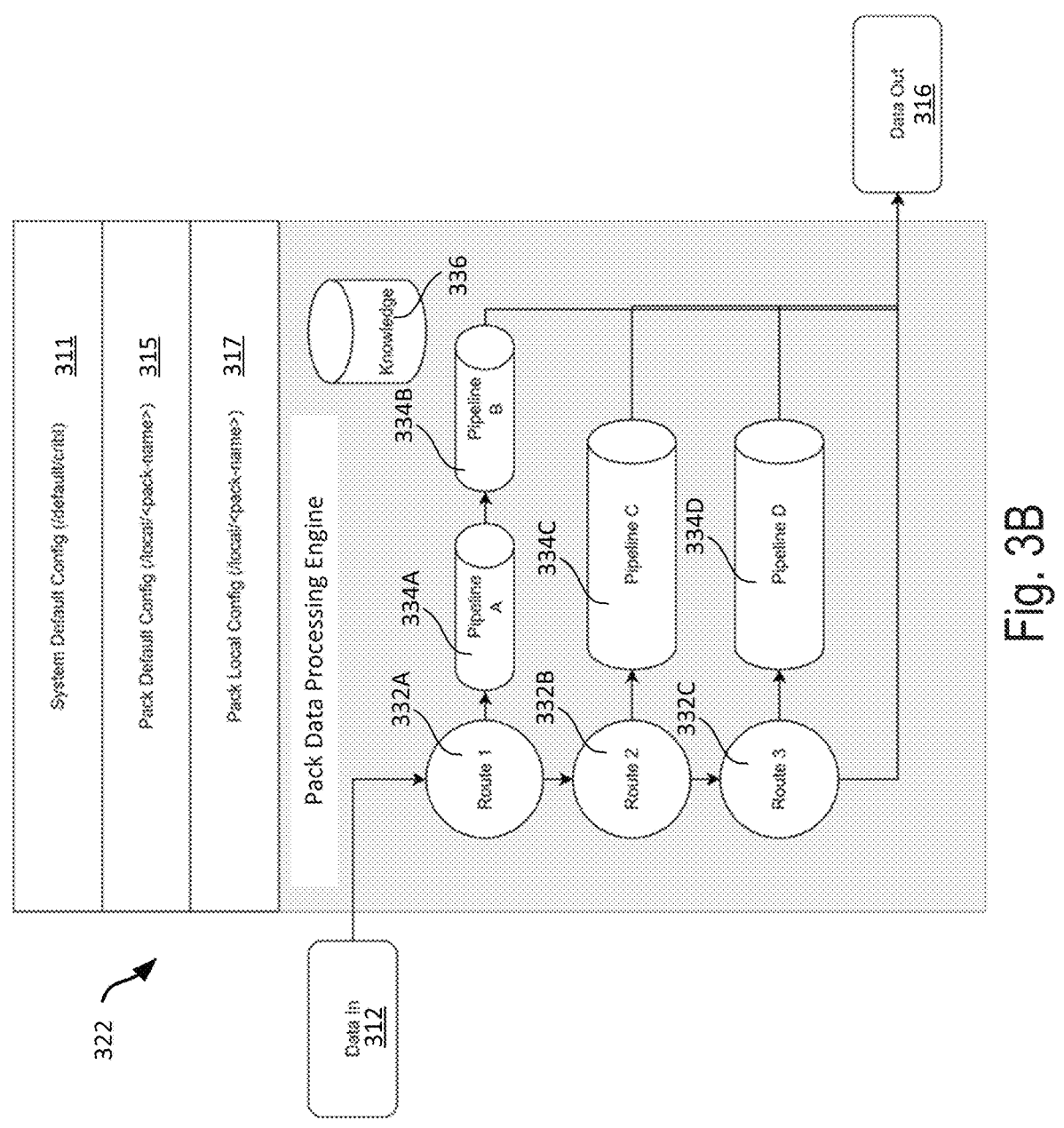
FIG. 3B is a block diagram showing a pack data processing engine in the example stream data processing engine shown in FIG. 2.

FIGS. 2 and 3A-3B are block diagrams showing aspects of an example observability pipeline system 300, an example data processing engine 314 in the example observability pipeline system 300, and an example pack data processing engine 322 in the example data processing engine 314. The example observability pipeline system 300 is configured to route events or data from one or more data sources 302 to one or more data destinations 304. Each of the data sources 302 may be implemented as the data source 102 in FIG. 1 or in another manner; and each of the data destination 304 may be implemented as the data destination

104 in FIG. 1 or in another manner. The example observability pipeline system 300 can be operated on a computer system (e.g., the example computer system 500 in FIG. 5).

As shown in FIG. 2, the example observability pipeline system 300 includes one or more inputs 312, one or more outputs 316, one or more data processing engines 314, system default configuration settings 311, and system local configuration settings 313. The example observability pipeline system 300 may include additional or different features, and the components of the example observability pipeline system 300 may operate as described with respect to FIG. 2 or in another manner. In some instances, the example observability pipeline system 300 can be implemented as the example observability pipeline process 110 in FIG. 1 or in another manner.

In some implementations, the observability pipeline system 300 stores pipeline input data from an external source 302 (e.g., Splunk, HTTP, Elastic Beats, Kinesis, Kafka, TCP JSON, etc.) as inputs 312, and the observability pipeline system 300 stores pipeline output data for an external destination 304 (e.g., Splunk, Kafka, Kinesis, InfluxDB, Snowflake, Databricks, TCP JSON, etc.) as outputs 316. In certain instances, an external source 302 may be a collector source, a push source, a pull source, a system and internal source, or another type of source; and an external destination 304 may be a streaming destination, a non-streaming destination, or another type of destination.

As shown in FIG. 2, the data processing engine 314 is applied to pipeline input data (the inputs 312) from data sources 302, and the data processing engine generates pipeline output data (the outputs 316) that can be delivered to data destinations 304. The pipeline input data may include logs, metrics, traces, stored data payloads, and possibly other types of machine data. In some cases, some or all of the machine data can be generated by agents (e.g., Fluentd, Collectd, OpenTelemetry) that are deployed at the data sources, for example, on various types of computing devices in a computing environment (e.g., in the computing environment 100 shown in FIG. 1, or another type of computing environment). The logs, metrics, and traces can be decomposed into event data that are consumed by the data processing engine. In some instances, logs can be converted to metrics, metrics can be converted to logs, or other types of data conversion may be applied. Stored data payloads represent event data retrieved from external data storage systems. For instance, stored data payloads can include event data that an observability pipeline process previously provided as output to the external data storage system.

Event data can be streamed to the data processing engine 314 for processing. Here, streaming refers to a continual flow of data, which is distinct from batching or batch processing. With streaming, data are processed as they flow through the system continuously (as opposed to batching, where individual batches are collected and processed as discrete units). In some instances, event data represent events as structured or typed key value pairs that describe something that occurred at a given point in time. For example, the event data can contain information in a data format that stores key-value pairs for an arbitrary number of fields or dimensions, e.g., in JSON format or another format. A structured event can have a timestamp and a "name" field. Instrumentation libraries can automatically add other relevant data like the request endpoint, the user-agent, or the database query. In some implementations, components of the events data are provided in the smallest unit of observability (e.g., for a given event type or computing environment). For instance, the event data can include data elements that provide insight into the performance of the computing environment to monitor, track, and triage incidents (e.g., to diagnose issues, reduce downtime, or achieve other system objectives in a computing environment).

The inputs 312 may include logs that represent events serialized to disk, possibly in several different formats. For example, logs can be strings of text having an associated timestamp and written to a file (often referred to as a flat log file). The logs can include unstructured logs or structured logs (e.g., in JSON format). For instance, log analysis platforms store logs as time series events, and the logs can be decomposed into a stream of event data.

The inputs 312 may include metrics that represent summary information about events, e.g., timers or counters. For example, a metric can have a metric name, a metric value, and a low cardinality set of dimensions. In some implementations, metrics can be aggregated sets of events grouped or collected at regular intervals and stored for low cost and fast retrieval. The metrics are not necessarily discrete and instead represent aggregates of data over a given time span. Types of metric aggregation are diverse (e.g., average, total, minimum, maximum, sum-of-squares) but metrics typically have a timestamp (representing a timespan, not a specific time); a name; one or more numeric values representing some specific aggregated value; and a count of how many events are represented in the aggregate.

The inputs 312 may include traces that represent a series of events with a parent/child relationship. A trace may provide information of an entire user interaction and may be displayed in a Gantt-chart like view. For instance, a trace can be a visualization of events in a computing environment, showing the calling relationship between parent and child events, as well as timing data for each event. In some implementations, individual events that form a trace are called spans. Each span stores a start time, duration, and an identification of a parent event (e.g., indicated in a parent-id field). Spans without an identification of a parent event are rendered as root spans.

The outputs 316 may include data formatted for log analytics platforms, data formatted for time series databases (TSDBs), data formatted for distributed tracing systems, data formatted for security information and event management (SIEM) or user behavior analytics (UBA) systems, and data formatted for event streaming systems or data lakes (e.g., a system or repository of data stored in its natural/raw format). Log analytics platforms are configured to operate on logs to generate statistics (e.g., web, streaming, and mail server statistics) graphically. TSDBs operate on metrics; example TSDBs include Round Robin Database (RRD), Graphite's Whisper, and OpenTSDB. Tracing systems operate on traces to monitor complex interactions, e.g., interactions in a microservice architecture. SIEMs provide real-time analysis of security alerts generated by applications and network hardware. UBA systems detect insider threats, targeted attacks, and financial fraud. Outputs 316 may be formatted for, and delivered to, other types of data destinations in some cases.

In the example shown in FIG. 2, the data processing engine 314 may includes a schema normalization module that converts the various types of event data to a common schema or representation to execute shared logic across different agents and data types. For example, machine data from various agents such as Splunk, Elastic, Influx, and OpenTelemetry have different, opinionated schemas, and the schema normalization module can convert the event data to normalized event data. Machine data intended for different destinations may need to be processed differently. Accordingly, the data processing engine 314 may include routing modules that routes the normalized event data (e.g., from the schema normalization module) to different processing paths depending on the type or content of the event data. The routing module can be implemented by having different streams or topics. The routing module may route the normalized data to respective functions. The functions can generate structured data from the normalized data; for instance, functions may aggregate, suppress, mask, drop, or reshape the normalized data provided to it by the routing module. The data processing engine 314 may include output schema conversion modules that schematize the structured data provided by the functions. The structured data may be schematized for one or more of the respective data destinations 304. For instance, the output schema conversion modules may convert the structured data to a schema or representation that is compatible with a data destination.

In some implementations, the system default configuration setting 311 are specified by an entity that owns, manages, or designs the example observability pipeline system 300. System default configuration settings 313 include settings that define properties of the example observability pipeline system 300. An examples of a system default configuration settings 311 is pipeline timeout; a default config setting for the pipeline timeout can 1000 milliseconds (ms) or another duration of time. In certain instances, the system default configuration settings 311 of the example observability pipeline system 300 cannot be modified by a user.

In some instances, the system local configuration settings 313 can be specified, configured, updated, or otherwise modified by a user of the example observability pipeline system 300. System local configuration settings 313 include local settings that define properties of the observability pipeline system 300 when being implemented in a local environment. Values of settings in the system local configuration settings 313 may be the same as or different from the values of settings in the system default configuration settings 311. For example, the system local configuration settings 313 may specify a different value for the pipeline timeout, e.g., 900 ms, 2000 ms, or another value, that can be different from the value (e.g., 1000 ms) specified in the system default configuration settings 311.

As shown in FIG. 3A, the example data processing engine 314 includes a pack data processing engine 322, routes 324A, 324B, 324C, pipelines 326A, 326B 326C, and knowledge objects 328. The example data processing engine 314 includes a configured set of routes, pipelines, and knowledge objects that convert pipeline input data to pipeline output data. The example data processing engine 314 may include additional or different features, and the components of the example data processing engine 314 may operate as described with respect to FIG. 3A or in another manner.

In some implementations, a route 324 includes a set of filters which is configured to select a subset of events or data to deliver to respective pipelines and respective destinations. For example, input routes can apply filter expressions on incoming input data to send matching results to one or more respective pipelines. In some instances, filters can include JavaScript-syntax-compatible expressions that are configured with each route 324. In some implementations, each data processing engine 314 includes multiple routes 324 and each of the multiple routes 324 can be associated with one pipeline and one output. Multiple routes 324 may be evaluated in order. In some instances, users may select to make a route non-final which allow the data to match the route (having it sent down the pipeline for that route), get cloned, and sent down the remaining list of routes in order to process the same event multiple times in various ways. For another example, output routes can send data to multiple destinations based on rules. As shown in FIG. 3A, the data processing engine 314 includes a first route 324A, a second route 324B, and a third route 324C.

In some implementations, a pipeline 326 receives events or data matched by a given route 324. In some implementations, pipelines 326 in the data processing engine 314 are processing pipelines. Each pipeline 326 includes a sequence of functions (e.g., built-in or custom) that can process events or data. A function includes codes that executes on an event, and it encapsulates the smallest amount of processing that can happen to that event, for example, string replacement, obfuscation, encryption, event-to-metrics conversions, or another type of processing. In particular, events are delivered to the beginning of a pipeline 326 by a route 324 and processed by the sequence of functions one after another when being passed through the pipeline 326. In some implementations, multiple pipelines 326 can be chained one after another to reuse similar functionality across routes. There can be built-in loop prevention to stop two pipelines 326 from referring to each other and causing an infinite loop where data would continuously pass between the same two pipelines and never exit the system. This prevention can be achieved by creating a signature for every pipeline within the observability pipeline system and signing each event that passes through the pipeline.

As shown in FIG. 3A, a first pipeline 326A receives input data from the second route 324B, and output of the first pipeline 326A is sent to a second pipeline 326B; a third pipeline 326C receives input data from the third route 324C; and a pack data processing engine 322 receives input data from the first route 324A. The pack data processing engine 322 is applied to the input data from the first route 324A received from a data source; and structured output data can be generated. In some implementations, the observability pipeline system 300 further includes output schemas conversion modules or other modules or components. In some cases, the output schemas are applied to the structured output data from the pack data processing engine 322; and observability pipeline output data can be generated for a data destination specified by the first route 324A.

In some instances, the data processing engine 314 may include additional or different features, and the components of the data processing engine 314 may operate as described with respect to FIG. 3A or in another manner. For example, the data processing engine 314 may include more routes 324 and each route 324 may include one or more pipelines 326. For another example, output input data from the first route 324A may be processed by one or more pipeline before being received by the pack data processing engine 322.

In some implementations, the knowledge objects 328 include various libraries. For example, the knowledge objects 328 include a Regex Library that contains a set of pre-built common regex patterns, a Grok Patterns Library that contains a set of pre-built common patterns, a lookup library used to enrich events (e.g., for lookup function), a Parsers Library containing Parsers that can be used extract or reserialize events (e.g., for Parser function), a Schema Library that contains Schemas that can be used to validate JSON events, and a Global Variables Library that contains Global Variables that can be accessed by functions in pipelines 326. In some instances, a type of global variables can be number, string, Boolean, object, array, expression, or another type. Knowledge objects 328 can be modular that are referenced within pipelines 326 to allow for reuse of common constructs which instill domain-level knowledge into the data processing engine 314.

In some implementations, the pack default configuration settings 315 defines default properties of the pack data processing engine 322 when the pack data processing engine 322 is initially defined. In some implementations, the pack local configuration settings 317 includes settings that specify properties for the components and processes (e.g., route, pipelines, etc.) in the pack data processing engine 322 when being operated in a specific local environment. The pack local configuration settings 317 are isolated or independent from the system local configuration settings 313. In some implementations, the pack local configuration settings 317 inherit at least one setting of the system default configuration settings 311 and at least one setting of the pack default configuration settings 315. In some instances, the pack local configuration settings 315 can also override at least one setting in the system default configuration settings 311 and at least one of the pack default configuration settings 315. The example pack data processing engine 322 has access to all of the default functions and knowledge objects that are available in the data processing engine 314.

The example pack data processing engine 322 may include additional or different features, and the components of the example pack data processing engine 322 may operate as described with respect to FIG. 3B or in another manner. In some instances, the data processing engine 314 may include more than one pack data processing engines 322, and the pack data processing engine 322 may be connected with other components of the data processing engine 314 in another manner. For example, a pack data processing engine 322 may receive input data from the first route 324A and output results to an output 316. In some instances, a pack data processing engine 322 may receive results from or output results to another pipeline 326.

In some instances, a pack data processing engine 322 can be specified when a pipeline is referenced, e.g., when attaching a pre-processing pipeline in a source, when attaching post-processing pipelines in a destination, in routing table's pipeline/output column, etc. In some instances, a pack data processing engine 322 can be accessed according to a deployment type. For example, in a single-instance deployment, a pack data processing engine 322 can be global; in a distributed deployment with a default single worker group (e.g., leader mode) or in a distributed deployment with multiple worker groups, the pack data processing engine 322 can be associated with worker groups and can be shared across different worker groups, e.g., by exporting or importing it as a pack file. In some instances, a pack data processing engine 322 can be upgraded, reconfigured, or otherwise modified.

In some implementations, a pack data processing engine 322 can be created using a computer system within a given worker group (or single-instance deployment). A pack data processing engine 322 that is installed may have a unique pack identification. The pack identification is determined according to the configuration of the pack data processing engine 322. In some instances, the pack data processing engine 322 may also include a pack version and minimum stream version, data type, use cases, technology and other information (e.g., keywords for describing a pack data processing engine 322). Such information is accessible to another user, when the pack data processing engine 322 is exported as a pack file and can be used for users when filtering and search for pack files.

In some instances, a pack data processing engine 322 can be exported as a pack file and shared between users in the same worker group or different worker groups. In some implementations, when a pack data processing engine is exported as a pack file, local modifications made to default configuration settings of the pack data processing engine can be merged into the pack default configuration settings. For example, when an export target is one or more worker group, the pack default configuration settings 315 and local modifications to the pack default configuration settings (e. g., pack local configuration settings 317) are exported together into a pack file. In some instances, the pack local configuration settings 317 may not be merged into the pack default configuration settings 315 when the pack data processing engine 322 is exported as a pack file. For example, when a local modification to the pack default configuration settings conflicts with the pack default configuration settings, the pack data processing engine 322 can be exported only with the pack default configuration settings 315. In certain instances, a pack data processing engine 322 can be directly exported to one or more worker groups. In some instances, for example in a distributed deployment, multiple pack data processing engines may be exported from one source worker group to one or more destination worker groups.

In some instances, a pack data processing engine 322 in a data processing engine 314 of an observability pipeline system 300 is defined and configured according to a pack file. For example, a pack file can be created by and received from a remote computer system. The pack file can be then imported to a computer system where an observability pipeline system 300 is operated and installed as part of the observability pipeline system. In some instances, a pack file includes routes, pipelines, and pack default configuration settings. The pack file further comprises knowledge objects (e.g., lookup library, Parsers library, Regexes library, Global Variables library, Grok Patterns library, or schemas library) and sample data. In some instances, sources, collectors, and destinations are excluded from a pack file and thus are not specified by a pack file. For example, a route configured in a pack does not need to specify a destination. For another example, a pack file does not need to include event breakers, which are associated with sources.

As shown in FIGS. 2 and 3A-3B, when pipeline input data is received and processed at the observability pipeline system 300 on the computer system, the pipeline input data can be routed to the pack data processing engine 322 in the data processing engine 314 and thus, the pack data processing engine 322 can be applied to the pipeline input data to generate structured output data.

Figure 4:
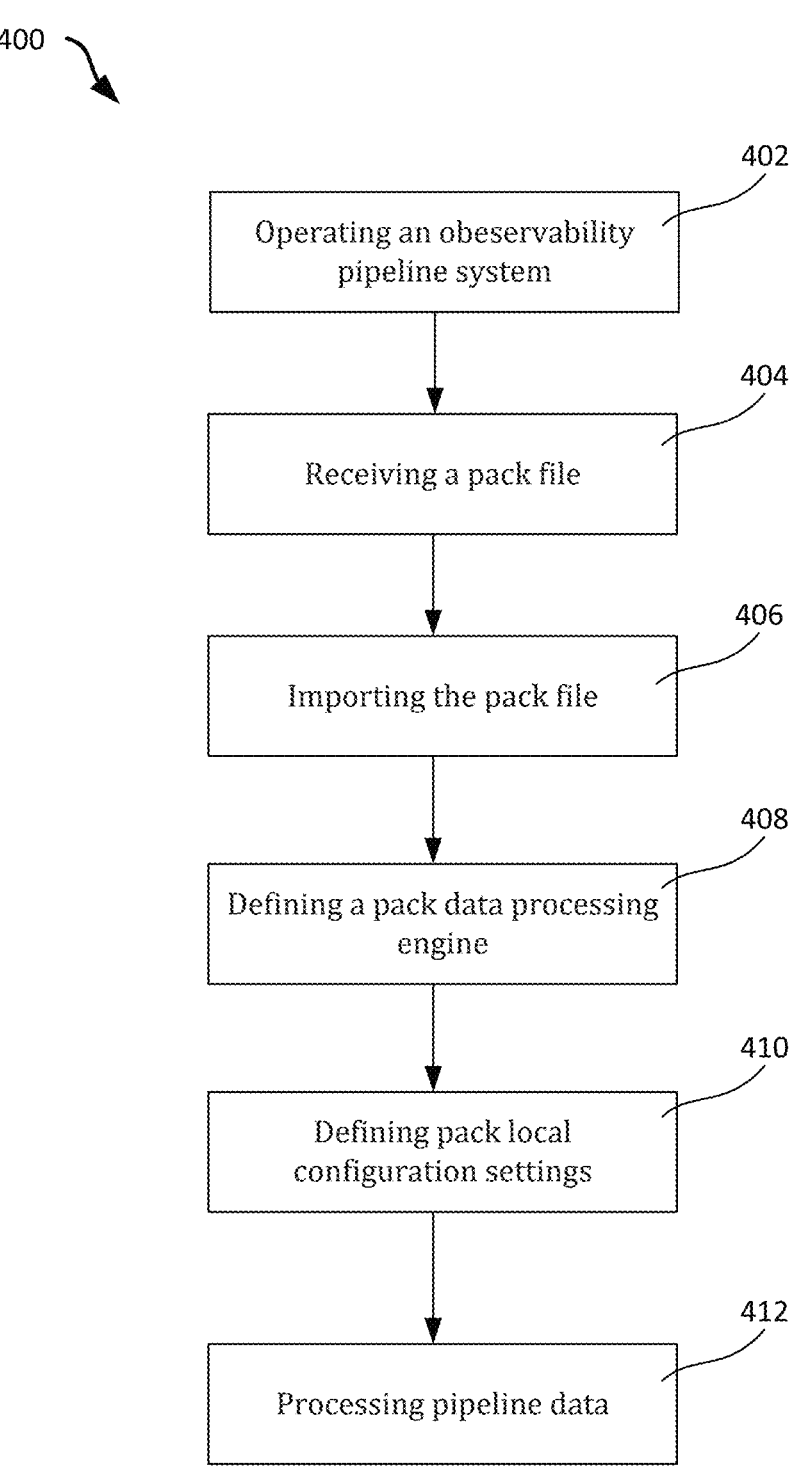
FIG. 4 is a flow diagram showing an example process of operating a pack data processing engine.

FIG. 4 is a flow diagram showing an example process 400 of operating a pack data processing engine. The example process 400 can be used for processing pipeline input data in an observability pipeline system. The example process 400 may include additional or different operations, including operations to fabricate additional or different components, and the operations may be performed in the order shown or in another order. In some cases, operations in the example process 400 can be combined, iterated or otherwise repeated, or performed in another manner.

The operations of the example process 400 may be performed on a computer system, for example the observability pipeline system 110 in FIG. 1. The computer system can operate in a computing environment that includes data sources, applications, data destinations, data storage, an observability pipeline system, and a user device. The computing environment may include additional or different features, and the elements of the computing environment may operate as described with respect to FIG. 1 or in another manner. In some cases, the data sources, data destinations, data storage, observability pipeline system, and user device are implemented as the data sources 102, data destinations 104, data storage 106, the observability pipeline system 110, applications 116, and user device 120 shown in FIG. 1, or they may be implemented in another manner.

At 402, the observability pipeline system is operated on the computer system. The observability pipeline system includes data processing engines, system default configuration settings and the system local configuration settings. Each data processing engine is configured according to the system default configuration settings and the system local configuration settings. In operation, the data processing engines process pipeline input data from one or more data sources and provide pipeline output data to one or more data destinations.

At 404, a pack file is received at the computer system. In some instances, the computer system is a leader role in a worker group. In some implementations, a pack file can be received from a trusted or authoritative public or private pack source location, e.g., a dispensary, a file, an URL, Github repository, or another pack source location. In some implementations, a pack file includes pre-configured routes, pipelines, and pack default configuration settings. The pack file may further include knowledge objects (e.g., lookup library, Parsers library, Regexes library, Global Variables library, Grok Patterns library, or schemas library) and sample data.

In some instances, a pack file may include information about a pack data processing engine to be installed on the computer system as part of the observability pipeline system, for example, purpose, compatibility, requirements, and installation of the pack data processing engine. In some instances, a pack file can be received through a URL by the computer system through an internet access (e.g., to the network 108 in FIG. 1), and further distributed to worker nodes within the same worker group through a local network.

At 406, the pack file is imported. In some instances, the pack file can be imported by installing the pack file on the computer system, which becomes part of the observability pipeline system operated on the computer system. In some implementations, multiple pack files can be imported and installed on the computer system. In some cases, multiple pack data processing engines can be defined in the observability pipeline system. Each of the multiple pack files include routes, pipelines, knowledge objects, and respective pack default configuration settings; and each of the pack data processing engines are defined with respective pack local configuration settings. In some cases, a user may manually select a pack file to be imported on the computer system.

At 408, the pack data processing engine is defined in the observability pipeline system according to the pack file. The pack data processing engine can be implemented as the pack data processing engine 322 in the data processing engine 314 of the example observability pipeline system 300 in FIGS. 2 and 3A-3B. For example, the pack data processing engine includes routes, pipelines, knowledge objects, and pack default configuration settings, which are included in the pack file. After the pack data processing engine is defined, the computer system may deploy the pack data processing engine in the observability pipeline system, for example by chaining the pack data processing engine with other routes, pipelines and other components or modules in a data processing engine of the observability pipeline system.

At 410, the pack local configuration settings for the pack data processing engine are defined. Once the pack data processing engine is defined in the observability pipeline system, the pack data processing engine can be reconfigured, changed, updated, or otherwise modified for a specific local computing environment. In some implementations, the pack local configuration settings are defined by the user on the computer system for the pack data processing engine 322. The pack local configuration settings 317 are isolated from the system local configuration settings 313. In some implementations, the pack local configuration settings 317 include settings that specify properties for the components and processes (e.g., route, pipelines, etc.) in the pack data processing engine 322 when being operated in a local environment. In some implementations, the pack local configuration settings 317 inherit at least one setting of the system default configuration settings 311 and at least one setting of the pack default configuration settings 315. In some instances, the pack local configuration settings 315 can also override at least one setting in the system default configuration settings 311 and at least one of the pack default configuration settings 315.

At 412, the pipeline input data is received by the observability pipeline system. The pipeline input data may be communicated to the observability pipeline system over a network (e.g., the network 108 shown in FIG. 1) or in another manner. The pipeline input data may be implemented as the pipeline input data 201 of FIG. 2, or other types of observability pipeline data. The pipeline input data may be placed in an in-memory queue. Alternatively, the pipeline input data may be stored to a file. Other methods for storage of the pipeline input data may be used.

In some implementations, at least a subset of the pipeline input data can be routed to the pack data processing engine in the data processing engine; and the pack data processing engine can be applied to the at least a subset of the pipeline input data. Once the at least a subset of the pipeline input data is received at the pack data processing engine, the at least a subset of the pipeline input data can be directed by the routes to respective pipelines of the pack data processing engine, where structured output data can be generated according to the respective pipelines along that route.

When pipeline input data is processed in the observability pipeline system, the input data is received from the data source; structured output data can be generated by applying the pack data processing engine to the pipeline input data; and when output schemas are applied to the structured output data, observability pipeline output data can be generated for the destination.

Figure 5:
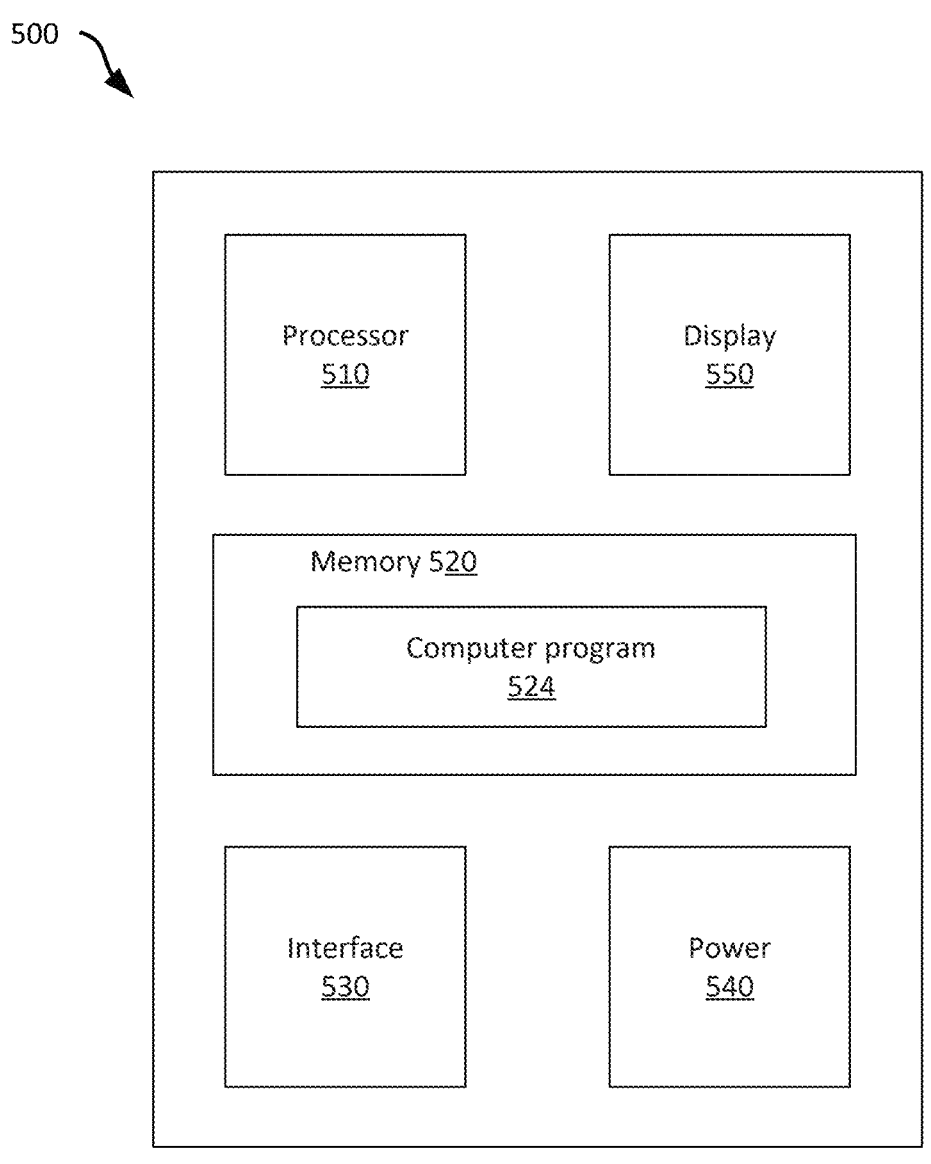
FIG. 5 is a block diagram showing an example computer system.

FIG. 5 is a block diagram showing an example of a computer system 500 that includes a data processing apparatus and one or more computer-readable storage devices. The term "data-processing apparatus" encompasses all kinds of apparatus, devices, nodes, and machines for processing data, including by way of example, a programmable processor, a computer, a system on a chip, or multiple ones, or combinations, of the foregoing, e.g., processor 510. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code), e.g., computer program 524, can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors, e.g., processor 510, executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory or a random-access memory or both, e.g., memory 520. Elements of a computer can include a processor that performs actions in accordance with instructions, and one or more memory devices that store the instructions and data. A computer may also include or be operatively coupled to receive data from or transfer data to, or both, one or more mass storage devices for storing data, e.g., magnetic disks, magneto optical disks, or optical disks. However, a computer need not have such devices. Moreover, a computer can be embedded in another device, e.g., a phone, an electronic appliance, a mobile audio or video player, a game console, a Global Positioning System (GPS) receiver, or a portable storage device (e.g., a universal serial bus (USB) flash drive). Devices suitable for storing computer program instructions and data include all forms of non-volatile memory, media, and memory devices, including by way of example, semiconductor memory devices (e.g., EPROM, EEPROM, flash memory devices, and others), magnetic disks (e.g., internal hard disks, removable disks, and others), magneto optical disks, and CD ROM and DVD-ROM disks. In some cases, the processor and the memory can be supplemented by, or incorporated in, special purpose logic circuitry.

The example power unit 540 provides power to the other components of the computer system 500. For example, the other components may operate based on electrical power provided by the power unit 540 through a voltage bus or other connection. In some implementations, the power unit 540 includes a battery or a battery system, for example, a rechargeable battery. In some implementations, the power unit 540 includes an adapter (e.g., an AC adapter) that receives an external power signal (from an external source) and converts the external power signal to an internal power signal conditioned for a component of the computer system 500. The power unit 540 may include other components or operate in another manner.

To provide for interaction with a user, operations can be implemented on a computer having a display device, e.g., display 550, (e.g., a monitor, a touchscreen, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to, and receiving documents from, a device that is used by the user; for example, by sending web pages to a web browser on a user's client device in response to requests received from the web browser.

The computer system 500 may include a single computing device, or multiple computers that operate in proximity or generally remote from each other and typically interact through a communication network, e.g., via interface 530. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship between client and server may arise by virtue of computer programs running on the respective computers and having a client-server relationship to each other.

The example interface 530 may provide communication with other systems or devices. In some cases, the interface 530 includes a wireless communication interface that provides wireless communication under various wireless protocols, such as, for example, Bluetooth, Wi-Fi, Near Field Communication (NFC), GSM voice calls, SMS, EMS, or MMS messaging, wireless standards (e.g., CDMA, TDMA, PDC, WCDMA, CDMA2000, GPRS) among others. Such communication may occur, for example, through a radio-frequency transceiver or another type of component. In some cases, the interface 530 includes a wired communication interface (e.g., USB, Ethernet) that can be connected to one or more input/output devices, such as, for example, a keyboard, a pointing device, a scanner, or a networking device such as a switch or router, for example, through a network adapter.

In a general aspect, an observability pipeline system includes a pack data processing engine.

In a first example, the observability pipeline system includes data processing engines, system default configuration settings, and system local configuration settings. The data processing engines are configured according to the system default configuration settings and the system local configuration settings. A pack file is received from a remote computer system at the computer system, the pack file comprising routes, pipelines, and pack default configuration settings. The pack file is imported in the observability pipeline system on the computer system. A pack data processing engine is defined in the observability pipeline system. The pack data processing engine includes the routes and pipelines from the pack file. Pack local configuration settings, defined for the pack data processing engine, inherit at least one of the system default configuration settings and at least one of the pack default configuration settings. The pack local configuration settings are isolated from the system local configuration settings. When pipeline data is processed in the observability pipeline system on the computer system, the pack data processing engine is applied to the pipeline data.

Implementations of the first example may include one or more of the following features. The pack local configuration settings override at least one of the system default configuration settings and at least one of the pack default configuration settings. When the pack data processing engine is applied to the pipeline data, input data is routed to the respective pipelines according to the routes; and structured output data is generated from the input data by operation of the pipelines. The plurality of data processing engines includes a first data processing engine including a first route. When the pipeline data is processed in the observability pipeline system, input data is routed to the pack data processing engine according to the first route; and the pack data processing engine is applied to the input data. The first route specifies a source and a destination. When the pipeline data is processed in the observability pipeline system, the input data is received from the source; structured output data is generated by applying the pack data processing engine to the input data; and output schemas are applied to the structured output data to generate observability pipeline output data for the destination. The pack file further includes knowledge objects and sample data.

Implementations of the first example may include one or more of the following features. The pack file is a first pack file; the pack data processing engine is a first pack data processing engine; the pack default configuration settings are first pack default configuration settings; and the pack local configuration settings are first pack local configuration settings. A second pack file is received from another remote computer system at the computer system. The second pack file includes second pack default configuration settings. The second pack file is imported in the observability pipeline system on the computer system. A second pack data processing engine is defined in the observability pipeline system. Second pack local configuration settings are defined for the second pack data processing engine. The second pack local configuration settings inherit at least one of the system default configuration settings and at least one of the second pack default configuration settings. The pack local configuration settings are isolated from the system local configuration settings and the first pack local configuration settings.

In a second example, a computer system includes one or more computer processors that perform one or more operations of the first example.

In a third example, a non-transitory computer-readable medium comprises instructions that are operable when executed by data processing apparatus to perform one or more operations of the first example.

While this specification contains many details, these should not be understood as limitations on the scope of what may be claimed, but rather as descriptions of features specific to particular examples. Certain features that are described in this specification or shown in the drawings in the context of separate implementations can also be combined. Conversely, various features that are described or shown in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single product or packaged into multiple products.

A number of embodiments have been described. Nevertheless, it will be understood that various modifications can be made. Accordingly, other embodiments are within the scope of the following claims.

The invention claimed is:

1. A method comprising:

at a computer system, receiving a pack file from a remote computer system, the pack file comprising routes, pipelines, and pack default configuration settings;

importing the pack file in an observability pipeline system on the computer system;

defining a pack data processing engine in the observability pipeline system, the pack data processing engine comprising the routes and pipelines from the pack file;

defining pack local configuration settings for the pack data processing engine, wherein the pack local configuration settings incorporate at least one of the pack default configuration settings and override at least one system default configuration setting; and processing pipeline data in the observability pipeline system on the computer system, wherein processing the pipeline data comprises applying the pack data processing engine to the pipeline data.

2. The method of claim 1, wherein the pack local configuration settings also override at least one of the pack default configuration settings.

3. The method of claim 1, wherein applying the pack data processing engine to the pipeline data comprises:

routing input data to the respective pipelines according to the routes; and generating structured output data from the input data by operation of the pipelines.

4. The method of claim 1, wherein a plurality of data processing engines comprises a first data processing engine comprising a first route, and processing the pipeline data in the observability pipeline system comprises:

routing input data to the pack data processing engine according to the first route; and applying the pack data processing engine to the input data.

5. The method of claim 4, wherein the first route specifies a source and a destination, and processing the pipeline data in the observability pipeline system further comprises:

receiving the input data from the source;

generating structured output data by applying the pack data processing engine to the input data; and applying output schemas to the structured output data to generate observability pipeline output data for the destination.

6. The method of claim 1, wherein the pack file further comprises knowledge objects and sample data.

7. The method of claim 1, wherein the pack file is a first pack file, the pack data processing engine is a first pack data processing engine, the pack default configuration settings are first pack default configuration settings, the pack local configuration settings are first pack local configuration settings, and the method comprises:

at the computer system, receiving a second pack file from another remote computer system, the second pack file comprising second pack default configuration settings;

importing the second pack file in the observability pipeline system on the computer system;

defining a second pack data processing engine in the observability pipeline system; and defining second pack local configuration settings for the second pack data processing engine, wherein the second pack local configuration settings incorporate at least one of the second pack default configuration settings.

8. A computer system:

one or more processors; and memory storing instructions that, when executed by the one or more processors, cause the one or more processors to perform operations comprising:

receiving a pack file from a remote computer system, the pack file comprising routes, pipelines, and pack default configuration settings;

importing the pack file in an observability pipeline system;

defining a pack data processing engine in the observability pipeline system, the pack data processing engine comprising the routes and pipelines from the pack file;

defining pack local configuration settings for the pack data processing engine, wherein the pack local configuration settings incorporate at least one of the pack default configuration settings and override at least one system default configuration setting; and processing pipeline data in the observability pipeline system, wherein processing the pipeline data comprises applying the pack data processing engine to the pipeline data.

9. The computer system of claim 8, wherein the pack local configuration settings also override at least one of the pack default configuration settings.

10. The computer system of claim 8, wherein applying the pack data processing engine to the pipeline data comprises:

routing input data to the respective pipelines according to the routes; and generating structured output data from the input data by operation of the pipelines.

11. The computer system of claim 8, wherein a plurality of data processing engines comprises a first data processing engine comprising a first route, and processing the pipeline data in the observability pipeline system comprises:

routing input data to the pack data processing engine according to the first route; and applying the pack data processing engine to the input data.

12. The computer system of claim 11, wherein the first route specifies a source and a destination, and processing the pipeline data in the observability pipeline system further comprises:

receiving the input data from the source;

generating structured output data by applying the pack data processing engine to the input data; and applying output schemas to the structured output data to generate observability pipeline output data for the destination.

13. The computer system of claim 8, wherein the pack file further comprises knowledge objects and sample data.

14. The computer system of claim 8, wherein the pack file is a first pack file, the pack data processing engine is a first pack data processing engine, the pack default configuration settings are first pack default configuration settings, the pack local configuration settings are first pack local configuration settings, and the operations comprise:

receiving a second pack file from another remote computer system, the second pack file comprising second pack default configuration settings;

importing the second pack file in the observability pipeline system on the computer system;

defining a second pack data processing engine in the observability pipeline system; and defining second pack local configuration settings for the second pack data processing engine, wherein the second pack local configuration settings incorporate at least one of the second pack default configuration settings.

15. A non-transitory computer-readable medium comprising instructions that are operable when executed by data processing apparatus to perform operations comprising:

receiving a pack file from a remote computer system, the pack file comprising routes, pipelines, and pack default configuration settings;

importing the pack file in an observability pipeline system on the computer system;

defining a pack data processing engine in the observability pipeline system, the pack data processing engine comprising the routes and pipelines from the pack file;

defining pack local configuration settings for the pack data processing engine, wherein the pack local configuration settings incorporate at least one of the pack default configuration settings and override at least one system default configuration setting; and processing pipeline data in the observability pipeline system on the computer system, wherein processing the pipeline data comprises applying the pack data processing engine to the pipeline data.

16. The non-transitory computer-readable medium of claim 15, wherein the pack local configuration settings also override at least one of the pack default configuration settings.

17. The non-transitory computer-readable medium of claim 15, wherein applying the pack data processing engine to the pipeline data comprises:

routing input data to the respective pipelines according to the routes; and generating structured output data from the input data by operation of the pipelines.

18. The non-transitory computer-readable medium of claim 15, wherein a plurality of data processing engines comprises a first data processing engine comprising a first route, and processing the pipeline data in the observability pipeline system comprises:

routing input data to the pack data processing engine according to the first route; and applying the pack data processing engine to the input data.

19. The non-transitory computer-readable medium of claim 18, wherein the first route specifies a source and a destination, and processing the pipeline data in the observability pipeline system further comprises:

receiving the input data from the source;

generating structured output data by applying the pack data processing engine to the input data; and applying output schemas to the structured output data to generate observability pipeline output data for the destination.

20. The non-transitory computer-readable medium of claim 15, wherein the pack file further comprises knowledge objects and sample data.

21. The non-transitory computer-readable medium of claim 15, wherein the pack file is a first pack file, the pack data processing engine is a first pack data processing engine, the pack default configuration settings are first pack default configuration settings, the pack local configuration settings are first pack local configuration settings, and the operations comprise:

receiving a second pack file from another remote computer system, the second pack file comprising second pack default configuration settings;

importing the second pack file in the observability pipeline system on the computer system;

defining a second pack data processing engine in the observability pipeline system; and defining second pack local configuration settings for the second pack data processing engine, wherein the second pack local configuration settings incorporate at least one of the second pack default configuration settings.

* * * * *